United States Patent [19]

Brand

[11] Patent Number: 4,457,876
[45] Date of Patent: Jul. 3, 1984

[54] MACHINE FOR PRODUCING WHIPPED CREAM AND OTHER AERATED FOOD PRODUCTS

[75] Inventor: Frederick C. Brand, Thurston, England

[73] Assignee: Jack Macmanus Research Limited (Great Britain), London, England

[21] Appl. No.: 446,614

[22] Filed: Dec. 3, 1982

[30] Foreign Application Priority Data

Dec. 4, 1981 [GB] United Kingdom ............... 8136720

[51] Int. Cl.$^3$ .............................................. B01F 3/04
[52] U.S. Cl. ....................................... 261/28; 99/460; 261/140 R; 261/DIG. 16; 366/101; 366/302; 366/336; 426/474; 426/519
[58] Field of Search ............. 261/28, 18 R, 94, 140 R, 261/DIG. 16, DIG. 26; 99/460; 426/474, 519, 570; 366/101, 102, 104, 302, 336

[56] References Cited

U.S. PATENT DOCUMENTS

| 1,648,575 | 11/1927 | Campbell | 261/DIG. 16 |
| 2,139,735 | 12/1938 | Dobkin | 261/28 X |
| 2,497,316 | 2/1950 | Logan | 261/28 |
| 3,606,266 | 9/1971 | MacManus | 261/28 |
| 3,700,214 | 10/1972 | MacManus | 261/DIG. 16 |
| 3,713,841 | 1/1973 | MacManus | 261/140 R X |
| 3,758,080 | 9/1973 | MacManus | 261/DIG. 16 |
| 3,810,415 | 5/1974 | MacManus | 261/94 X |
| 4,144,293 | 3/1979 | Hamoto et al. | 426/519 X |
| 4,168,727 | 9/1979 | Yoshida | 366/101 X |

FOREIGN PATENT DOCUMENTS

| 46-36186 | 10/1971 | Japan | 261/DIG. 16 |
| 483958 | 4/1938 | United Kingdom | 261/DIG. 16 |
| 1250497 | 10/1971 | United Kingdom | |

*Primary Examiner*—Richard L. Chiesa
*Attorney, Agent, or Firm*—Cushman, Darby & Cushman

[57] ABSTRACT

A cream whipping machine has an electric motor (1), a vane pump (3,9) and a whipping barrel (26) fitted closely together in axial alignment. Air and cream are sucked in to the pump chamber (14) via an intake assembly (16). A pump rotor (3) is fixed to a motor shaft (2) and a pump casing (9) together with the whipping barrel (26) and intake assembly (16), may be withdrawn from the rotor by undoing bolts (11). A space (13) to the motor side of a main pump seal (8) is vented to atmosphere through an opening (12) so that if the seal fails the liquid product is not forced into the motor.

10 Claims, 2 Drawing Figures

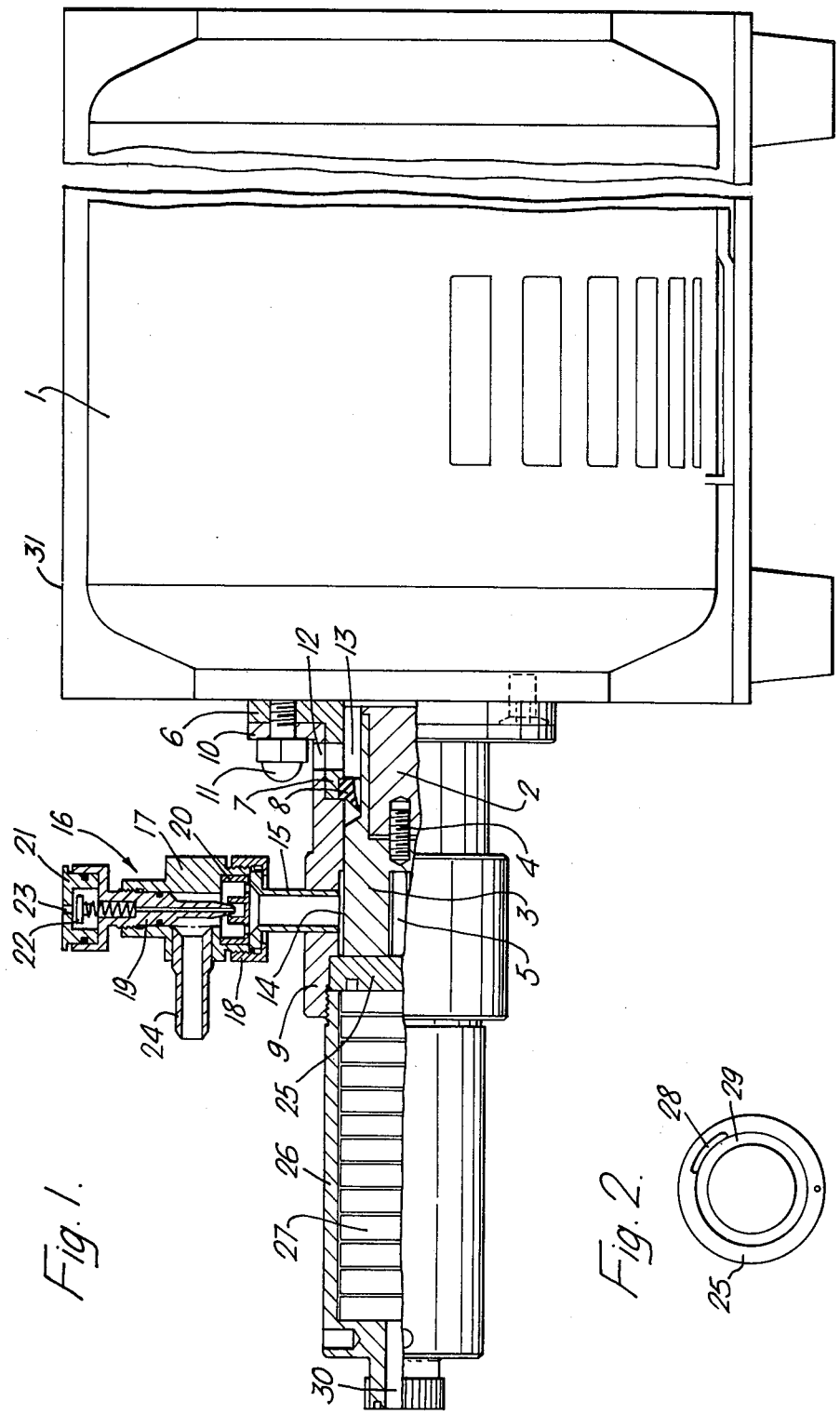

MACHINE FOR PRODUCING WHIPPED CREAM AND OTHER AERATED FOOD PRODUCTS

The invention is concerned with a machine for producing aerated food products, particularly whipped cream, and of the kind generally described in British patent specification No. 1,250,497. Such a machine has a motor-, usually an electric motor-, driven pump which has an inlet connected both to an air suction intake and to a liquid product suction intake which is, in use, connected through a suction tube to an unpressurized liquid product container, whereby in use liquid product and air are simultaneously drawn into the pump, the pump having an outlet connected to a product discharge outlet through a flow path which incorporates a static homogenizer for emulsifying the mixture. Such a machine, which is hereinafter referred to as of the kind described, is used in filling or decorating pastries, cakes and other confectionary.

The particular machine described in British Pat. No. 1,250,497 has, in the bottom of its casing, an electric motor mounted with the axis of its rotor and driven shaft vertical. A turret extends upwards from the motor and supports at its upper end a vane pump. The pump rotor, the axis of which is also vertical, is connected to the motor shaft via keyed coupling members, and is supported by bearings in the bottom of the pump body. The top of the pump chamber is closed by an elaborate cover plate incorporating inlets for the liquid product and air, and an outlet duct leading via a right angle through a spring loaded non-return valve to one end of a horizontally extending whipping barrel which forms the static homogenizer and incorporates a pack of shaped discs providing a tortuous path through which the mixture is forced by the pump. A solenoid operated check valve is provided between the downstream end of the whipping barrel and a downwardly extending discharge nozzle. The solenoid valve is automatically opened when the pump motor is started.

Although this machine has operated satisfactorily for a number of years, it suffers from one problem. This is that, upon failure of a seal at the bottom of the pump chamber, liquid product in the pump chamber is inevitably forced downwards under gravity and the pump pressure into the bearings of the pump, causing these to seize up before the operator has appreciated that any seal failure has occurred. This has necessitated rebuilding of the pump in response to the failure of a simple seal.

In accordance with the invention, in a machine of the kind described, the motor and pump are arranged end to end with their axes substantially horizontal; a rotor of the pump is carried by and fixed to a driven shaft of the motor; and a space between a seal at the end adjacent to the motor of a pump chamber, in which the rotor works, and the motor is vented to atmosphere.

This important modification leads to the advantage that failure of the seal at the end of the pump chamber adjacent to the motor does not allow gravitational or forced flow of the liquid product into the motor, the bearings of which now carry the pump rotor. As the space between the pump seal and motor is vented to atmosphere pressure is lost as soon as the seal fails. Such venting may, if provided for example by one or more slots or other openings in a tubular housing interconnecting the pump and motor, also provide a visual warning to the operator that the pump seal has failed. He would appreciate this as soon as the product starts to ooze through the vent opening.

A second advantage of the horizontal layout is that the motor, pump and whipping barrel can all be mounted very compactly in axial alignment. Thus when the pump is a vane pump, the end of the pump chamber adjacent to the whipping barrel and remote from the motor may be closed by a simple disc which is positioned directly between the pump and whipping barrel and provides the outlet opening from the pump and leading directly into the whipping barrel. This arrangement eliminates the spring loaded non-return valve provided in the pump cover plate of the machine described in British Pat. No. 1,250,497, but, surprisingly, we find that this is not now necessary.

In the vane pump of the machine described in British Pat. No. 1,250,497, the vanes of the vane pump are, as is usual, spring loaded out of radial slots in the rotor so that the edges of the vanes remain in sweeping engagement with eccentric wall of the pump chamber at all times, including when the pump motor is off. We now find that surprising advantages arise if the vane springs are eliminated.

During normal operation centrifugal force keeps the vanes in sweeping engagement with the wall of the pump chamber so that full pump pressure can be developed. However, upon shut-off, product under pressure in the whipping barrel can expand backwards into and possibly slightly through the pump chamber, this being accommodated by retraction of the vanes into the rotor slots under the product pressure. This enables the solenoid operated shut-off valve at the downstream end of the whipping barrel to be eliminated, with a commensurate significant reduction in cost, without danger of oozing through the product outlet nozzle, upon shut-off.

A further advantage of eliminating the vane springs arises on start up since the full load is not a applied to the motor until the pump rotor is rotating fast enough to throw the vanes centrifugally outwards and this avoids overstraining a motor which will not provide a full torque upon starting up before a minimum running speed has been achieved. Further improvements in this respect is achieved if the motor is an electric motor of the capacitance start type, which provides high starting torque.

A third advantage of eliminating the vane springs is that they can no longer become lost when the pump is stripped down for washing and cleaning by a non-skilled operator. Experience shows that this is a problem which has frequently occurred in the past.

An example of a machine constructed in accordance with the invention is illustrated in the accompanying drawing, in which:

FIG. 1 is a side elevation with parts in vertical axial section; and,

FIG. 2 is an axial elevation of a distribution disc.

The machine has a ventilated, capacitance start, induction running electric motor 1 with a projecting driven shaft 2. A rotor 3 of a vane pump is fitted on the shaft 2 and secured thereto by a screw connection 4. A pair of diametrically opposed radially working vanes 5 are provided in the rotor.

An end plate 6 has a flange which is secured to an end wall of the motor housing and a tubular projection 7 which carries a flexible seal 8 sealing against the rotor. A tubular casing 9 of the pump surrounds the rotor, fits over the tubular projection 7 and has a flange 10 by which it is secured to the end plate 6 by means of bolts 11. Aligned venting openings 12 are provided at upper and lower diametrically opposed positions through the projection 7 and casing 9 from a space 13 to atmosphere. This space is between the seal 8, which effectively seals one end of the pump chamber 14 and a seal within the motor housing. In the event of failure of the seal 8, pressurised liquid product from the chamber 14 is free to ooze out through the openings 12, where it is readily seen rather than being forced under the pump pressure into the motor.

The pump casing 9 has an opening in which is fitted a tubular coupling 15 from an intake assembly 16. The assembly has a body 17 which is connected to the coupling 15 by means of a nut 18 and houses an air intake needle valve 19 which is screwed into or out of the body 17 to adjust the throttling of air drawn in under the pump suction via an insert 20. The intake end of the needle valve comprises an insert 21 which cooperates with a spring loaded valve member 22 such that an outer air inlet opening 23 is only opened when a minimum suction is applied. The body 17 also carries a spigot 24 for receiving one end of a flexible hose, the other end of which will normally be provided with a weighted inlet piece with a sieve filter. This is arranged to rest in the bottom of a reservoir of unpressurised liquid product. The assembly thus acts to allow a mixture of air and liquid product to be drawn into the pump in a relative proportion depending upon the setting of the needle valve 19.

The end of the pump chamber 14 remote from the motor is closed by a distribution disc 25 which is held in place by a casing 26 of a whipping barrel which screws into the adjacent end of the pump casing 9. The whipping barrel incorporates a number of shaped discs 27 similarly to the whipping barrel described in British Pat. No. 1,250,497. As shown in FIG. 2, the disc 25 has an arcuate port 28 communicating with a circular recess 29 such that the mixture of liquid product and air in the pump chamber 14 is forced by the action of the pump out through the distribution disc and along a tortuous path between the discs 27 to an outlet 30. This outlet will be provided with an appropriate fitting, such as an angular downwardly facing star shaped nozzle for depositing the whipped product on confectionary, or a flexible hose for use in connection with a piping bag.

Regular and thorough cleaning is necessary for hygiene. The whipping barrel can readily be unscrewed from the pump casing and the discs removed for cleaning. Similarly, with or without removal of the whipping barrel, the pump casing, together with the intake assembly 16 can readily be withdrawn from the electric motor and off the rotor 3 by undoing the bolts 11. It will be appreciated that this withdrawal leaves the seal 8 in situ and all parts in contact with the food product will then be accessible for cleaning.

The machine may be readily portable, in which case, and as shown in FIG. 1, the motor 1 is closely surrounded by a housing 31 from which the pump whipping barrel projects, so that the intake assembly is readily accessible and a hose can be trailed into an adjacent liquid product reservoir. Alternatively, the machine may be on a larger scale and have a casing, a lower part of which houses the motor and from which the pump and whipping barrel project, and an upper part of which provides a refrigerated compartment in which a reservoir of liquid product stands.

I claim:

1. A machine for producing aerated food products comprising a motor-driven pump having an inlet connected both to an air suction intake and to a liquid product suction intake which is, in use, connected through a suction tube to an unpressurised liquid product container, whereby in use liquid product and air are simultaneously drawn into said pump, said pump having an outlet connected to a product discharge outlet through a flow path which incorporates a static homogenizer for emulsifying the mixture; wherein said motor and said pump are arranged end to end with the axes thereof substantially horizontal; a rotor of said pump is carried by and fixed to a driven shaft of said motor; and a space between a seal at the end adjacent to said motor of a pump chamber, in which said rotor works, and said motor is vented to atmosphere via vent means.

2. A machine according to claim 1, wherein said vent means is provided by at least one opening in a tubular housing interconnecting said pump and said motor.

3. A machine according to claim 2, wherein said pump has a tubular casing which is removably secured to an end of a housing of said motor, whereby upon release of said pump casing, said pump casing may be withdrawn axially from said rotor for cleaning.

4. A machine according to claim 3, wherein said air and liquid product suction intakes are carried by said pump casing and are withdrawn therewith.

5. A machine according to claim 3, wherein said pump casing is removably secured to an end plate fixed to said motor housing, said end plate carrying said seal which seals against said pump rotor, and said seal remaining in situ upon withdrawal of said pump casing.

6. A machine according to claim 5, wherein said end plate has a tubular axial projection over which said pump casing fits, said seal being carried by said projection, and said vent opening is formed through said projection and said pump casing to the side of said seal adjacent to said motor.

7. A machine according to claim 1, wherein said static homogenizer is a whipping barrel incorporating a pack of shaped discs and said barrel is connected directly to said pump in axial alignment with said pump and motor.

8. A machine according to claim 7, wherein said pump is a vane pump and the end of said pump chamber adjacent to said whipping barrel is closed by a disc providing an outlet opening from said pump and leading directly into said whipping barrel.

9. A machine according to claim 1, wherein said pump is a vane pump and said rotor is provided with radially sliding vanes, said means being adapted to be moved radially outwardly solely under centrifugal force upon rotation of said rotor.

10. A machine according to claim 1, wherein said motor is of the ventilated, capacitance start type.

* * * * *